United States Patent
Rhee et al.

(10) Patent No.: US 7,912,330 B2
(45) Date of Patent: Mar. 22, 2011

(54) PACKAGING METHOD OF TEMPERATURE INSENSITIVE ARRAYED WAVEGUIDE GRATING

(75) Inventors: Tae Hyung Rhee, Seongnam (KR); Hyung Jae Lee, Yongin (KR); Tae Hun Kim, Yongin (KR)

(73) Assignee: Pointek Incorporation, Kyunggi-Do (KR)

( * ) Notice: Subject to any disclaimer, the term of this patent is extended or adjusted under 35 U.S.C. 154(b) by 897 days.

(21) Appl. No.: 11/794,767

(22) PCT Filed: Jun. 30, 2005

(86) PCT No.: PCT/KR2005/002050
§ 371 (c)(1),
(2), (4) Date: Jul. 5, 2007

(87) PCT Pub. No.: WO2006/073229
PCT Pub. Date: Jul. 13, 2006

(65) Prior Publication Data
US 2008/0135169 A1    Jun. 12, 2008

(30) Foreign Application Priority Data
Jan. 7, 2005    (KR) .................. 10-2005-0001583

(51) Int. Cl.
*G02B 6/34* (2006.01)
(52) U.S. Cl. .............. 385/37; 385/24; 156/256
(58) Field of Classification Search .......... 385/24, 385/37; 156/256
See application file for complete search history.

(56) References Cited

U.S. PATENT DOCUMENTS

| | | | |
|---|---|---|---|
| 6,470,119 B1 | 10/2002 | Albrecht et al. | |
| 6,668,117 B2 | 12/2003 | Hasegawa et al. | |
| 6,738,545 B1 | 5/2004 | Purchase et al. | |
| 6,788,848 B2 * | 9/2004 | Yoneda | 385/37 |
| 6,954,566 B2 * | 10/2005 | Johannessen | 385/37 |
| 7,062,127 B2 * | 6/2006 | Purchase et al. | 385/37 |
| 2002/0122623 A1 | 9/2002 | Yoneda | |
| 2003/0128932 A1 | 7/2003 | Samiec et al. | |

FOREIGN PATENT DOCUMENTS

| | | |
|---|---|---|
| JP | 2001124950 | 5/2001 |
| JP | 2001188141 A | 7/2001 |
| JP | 20026158 A | 1/2002 |

* cited by examiner

*Primary Examiner* — Daniel Petkovsek
(74) *Attorney, Agent, or Firm* — The Webb Law Firm (57) ABSTRACT

The temperature dependency of center wavelength of AWG is compensated by adjusting optical input position by cutting interface between input slab waveguide of AWG and stripe waveguide circuit connected to input slab, followed by attaching lateral sliding rod which has larger Coefficient of Thermal Expansion than chip substrate. These cut-elements are passively re-aligned on the top surface of the alignment base substrate. The cut-element of AWG main body is adhered on alignment base substrate, and the cut-element of the strip waveguide circuit connected to the input slab is attached to the lateral sliding rod. The gap between the facets of re-aligned two cut-elements is maintained by inserting thin film followed by filling gap-fill material with no flowing nature to minimize degradation of optical characteristics and maintain free lateral movement between these two cut-elements.

15 Claims, 4 Drawing Sheets

PACKAGING METHOD OF TEMPERATURE INSENSITIVE ARRAYED WAVEGUIDE GRATING

TECHNICAL FIELD

The present invention relates to the planar arrayed waveguide grating which is used for the wavelength division multiplexing and demultiplexing of the optical signal in the optical transmission, and it especially regards to the temperature insensitivity of the center wavelength.

BACKGROUND ART

WDM telecommunication system, which is frequently used to transmit large bandwidth information, transmits the optical signal with 'N' number of wavelengths simultaneously through a single line of an optical fiber. Since the maximum bandwidth is carried out with a single optical fiber line in the long haul transmission, DWDM transmission is usually carried the many wavelengths which are separated by the certain spacing of 1.0 nm or less. The AWG (Arrayed Waveguide Grating) multiplexex/demultiplexer is frequently used at the end of receiver units to demultiplex the optical signal with multiplexed many wavelengths.

Figure 1:
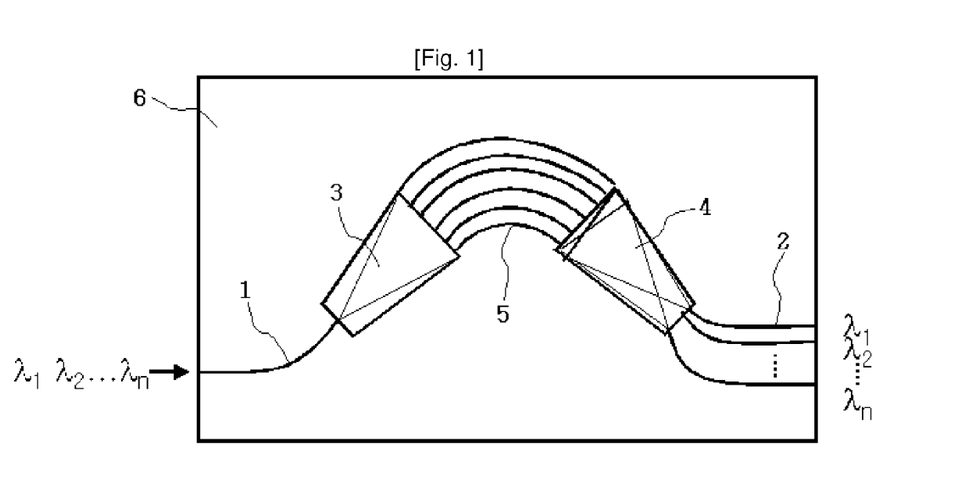
FIG. 1 is a schematic illustration of a conventional Arrayed Waveguide Grating.

FIG. 1 represents the schematic illustration of the conventional Arrayed Waveguide Grating. The conventional AWG consists one (or more) stripe waveguide circuit (1) connected to the input slab waveguide from the input optical fiber, output waveguide circuits (2) to the output fibers from output slab waveguide, two of slab waveguides (3, 4) and arrayed waveguides (5) on a planar substrate (6). The multiplexed optical signal entered into the stripe waveguide circuit (1) connecting the input slab waveguide is spread out at the input slab waveguide (3) section by diffraction and the resultant signal is propagated into the arrayed waveguides (5) which have the different lengths of waveguides. Because of the propagation length differences among the adjacent waveguides, each light in each waveguide in the arrayed waveguides (5) section arrives at the output slab waveguide (4) with the different phase. The resultant light arriving at the output slab waveguide represent the linear line of the in-phase plane, and the optical signal of the different wavelengths makes the different slop of the linear line of the in-phase plane because of the wavelength-phase selectivity. Therefore, the optical signal of the different wavelength has the different position where the light condenses. Then the output waveguide circuits (2) from the output slab waveguide can be located at these light-condense positions to separate the multiplexed signal.

The operation theory can be simply illustrated by Formula (1):

$$(n_s * d * \sin \phi) + (n_c * \Delta L) = m * \lambda \quad \text{(Formula 1)}$$

wherein $n_s$ is the refractive index of the slap waveguide, d is the pitch of the waveguide in the arrayed waveguides section at the interface between arrayed waveguides and output slab waveguide, $\phi$ is the diffraction angle of propagation light from arrayed waveguides to the output slab waveguide, $n_c$ is the refractive index of the core of arrayed waveguides, $\Delta L$ is the difference of the length in the waveguides among the arrayed waveguides, m is the diffraction degree and $\lambda$ is the wavelength of output light Therefore, the following Formula (2) can be derived from Formula (1) where center wavelength is defined to be the center of the light wavelength exiting out at the output waveguide circuit located at the 0 degree of diffraction angle, $\phi$.

$$\lambda_0 = n_c * (\Delta \lambda / m) \quad \text{(Formula 2)}$$

The waveguide layer (14) of AWG mainly consists of silica glass material. Because the refractive index of the silica glass material can be changed with the temperature variation, the optical wavelength characteristics of AWG composed with such silica glass material waveguide can be changed upon the temperature variation. As well, the length of waveguides can be changed because the silicon substrate (6), which is the main substrate materials for AWG fabrication, experiences either thermal contraction or thermal expansion because of the temperature variation, and these thermal behaviors result the undesired center wavelength shift of the output demultiplexed light at the output waveguide circuits (2). To understand the temperature dependency of center wavelength, Formula 2 is differentiated by temperature term, T, and the result is shown as Formula 3.

$$d\lambda/dT = (\lambda/n_c)*(dn_c/dT) + (\lambda/\Delta L)*(d\Delta L/dT) = (\lambda/n_c)*(dn_c/dT) + (\lambda/a_s) \quad \text{(Formula 3)}$$

wherein $a_s$ is the thermal expansion coefficient of the substrate.

The first term in Formula 3, $(\lambda/n_c)*(dn_c/dT)$, expresses the temperature dependency of the refractive index of the waveguide. For example, the temperature dependency of the refractive index of the waveguide can be calculated as $(\lambda/n_c)*(dn_c/dT) = 0.0085$ nm/K where the refractive index change of silica glass as a waveguide upon the temperature change, $(dn_c/dT)$, in general is $8 \times 10^{-6}$/K, refractive index of waveguide is $n_c = 1.45$, and center wavelength is $\lambda_0 = 1550$ nm. The second term, $(\lambda/a_s)$, expresses the temperature dependency of wavelength upon the thermal expansion and contraction of the substrate (6). For example, the temperature dependency of the wavelength is $\lambda/a_s = 0.0036$ nm/K where the CTE of silicon substrate is $a_s = 2.5 \times 10^{-6}$/K. Therefore, the center wavelength shift upon the temperature variation is $(d\lambda/dT) = 0.012$ nm/K. This calculated value is well matched with the measured value, 0.01 lnm/K, from the conventional AWG chip.

DISCLOSURE OF INVENTION

Technical Problem

In order to maintain the wavelength stability to the temperature of an AWG, the conventional technology is to attach the temperature control devices. However, these temperature control devices such as Peltier devices or heater devices requires the electric power supply as well as the applicable outdoor environments to operate the device are limited. The present invention represents the method to manufacture temperature insensitive AWG.

Technical Solution

The wavelength multiplexing and demultiplexing characteristics of AWG are expressed from characteristics of the light to focus on the specific position with the specific wavelength according to the related formula. Therefore, the wavelengths of lights to enter into the output waveguide circuits (2) can be shifted when the position of input stripe waveguide circuit (1) is moved horizontally (x-direction in FIG. 2). The wavelength at the output waveguide circuits (2) can be changed by dl when the position of the input stripe waveguide circuit (1) is moved by dx in the horizontal direction from the center of the focal point of the input slab waveguide (3). The relationship is shown in Formula 4.

$$dx/d\lambda = [L_f * \Delta L / (n_s * d\lambda_0)] * n_g \quad \text{(Formula 4)}$$

wherein $L_f$ is the focal length of the slab waveguide and $n_g$ is the group refractive index of arrayed waveguides. Formula 5 can be derived from Formula 4 where T is defined as the temperature variation.

$$dx=[L_f*\Delta L/(n_s*d*\lambda_0)]*n_g*(d\lambda/dT)*T \quad \text{(Formula 5)}$$

Figure 2:
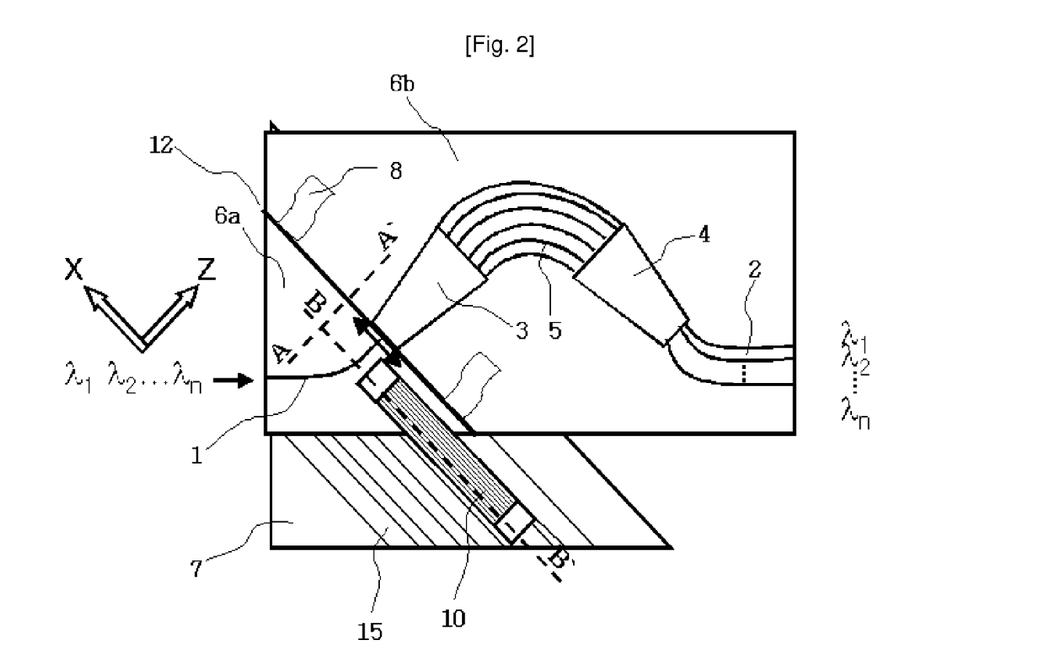
FIG. 2 is a schematic illustration of the temperature insensitive AWG, in accordance with the present invention.

As shown in Formula 5, the temperature dependency of the wavelength can be compensated when the position of the input stripe waveguide circuit (1) is moved in the horizontal direction although the wavelength at the output waveguide circuit (2) is shifted upon the temperature variation. For example, the distance of the position movement of the input stripe waveguide circuit can be calculated in Formula 6 in order to compensate the wavelength shift upon the temperature variation where the focal length Lf is 13 mm, the difference of the length in the waveguides among the arrayed waveguides, $\Delta L$ is 40 um, the pitch of the waveguide in the arrayed waveguides section at the interface between arrayed waveguides and output slab waveguide d is 14 um and the diffraction degree m is 38, $$dx=\sim 0.28T(um) \quad \text{(Formula 6)}$$

As a result, the wavelength shift at 50° C. temperature variation can be compensated when the input stripe waveguide circuit is moved 14 um in the horizontal direction.

In order to move the position of the input stripe waveguide circuit passively upon the temperature change, it is necessary to move horizontally (x-direction) the position of the input stripe waveguide circuit attached with the lateral sliding rod (10) having larger CTE than substrate when this sliding rod is experiencing thermal expansion and contraction.

Advantageous Effects

In accordance with this present invention, it is very advantageous to have simple manufacturing processes and to maintain the stable device operation because the 5 optical axes (y, z, $\theta_x$, $\theta_y$, $\theta_z$), except for x axis, that the cut-element with the strip waveguide circuit connected to the slab must have a degree of freedom to control the center wavelength adjustment, is aligned using the passive alignment technique by: 1) that the cut-element having the stripe waveguide circuit and the other cut-element of AWG main body are separated from the same AWG chip at the interface between the stripe waveguide circuit (1) and input slab waveguide (2); 2) that these cut-elements are re-aligned on the top surface of the alignment base substrate (7); 3) that the thin film (8) is inserted into the gap of both cut-element to maintain the gap-distance. In this present invention, an optical transparent, flexible and highly viscose gap-fill material (9) is used to fill out the gap width (16) of the optical alignment. It results the efficient optical alignment and it maintains the effective optical alignment. As well, it provides the very reliable alignment performance without having the any additional structure in order to maintain the optical alignment because the gap (11) between the cut-element (6a) and the alignment base substrate (7) is filled by the gap-fill material (9) having the similar properties. Therefore, it guarantees the device operation at the even humidity condensed low temperature environment.

BRIEF DESCRIPTION OF THE DRAWINGS

The subject matter, which is regarded as the invention, is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which:

BEST MODE FOR CARRYING OUT THE INVENTION

In general, either a silicon or quartz glass wafer is used for the substrate in an AWG. In the present invention, a silicon-substrate based AWG chip is used and the 1mm-thickness silicon substrate, which is the same materials as the substrate for the two-cut elements (6a, 6b), is used also for an alignment base substrate (7). The cut-cross section (12) of the AWG chip has the sharp edge and it is easily fragile for this sharp edge when the two-cut elements (6a, 6b) are collided against each other or against the alignment base substrate (7). In addition, facet-chipping at the upper edge of any cut-element (6) may cause the optical loss because the optical waveguides are formed in this specific area. Also, facet-chipping at the bottom edge of any cut-element (6) may cause the optical performance degradation of the device because the small chipping particles can enter into the gap between the substrate of any cut element (6) and the alignment base substrate (7) and the optical mis-alignment are resulted.

In this present invention, the PET thin films (8) with 5 um thickness are inserted into the both end of the gap (16) between the diced surfaces (12a, 12b) from two-cut elements (6). In addition, a groove with 1 mm-width and 150 um-depth is formed at the alignment base substrate right underneath of the alignment facets of the said two cut-elements in order to prevent the small chipping particle being held between the two cut-elements by dropping the chipping particle into the groove. As well, a specific adhesive-stop groove is formed at the adhesion area to prevent the adhesive running out of the adhesion area when the cut-element of the AWG main body is attached to the said alignment base substrate.

Figure 6:
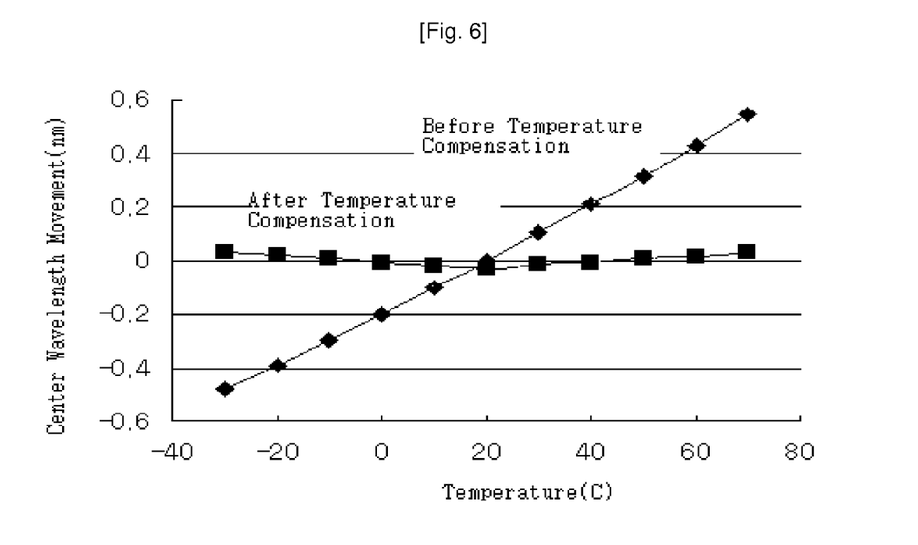
FIG. 6 is a graphical illustration of center wavelength characteristics performed by the temperature insensitive AWG produced by the present invention.

Among the assembly parts of the lateral sliding rod assembly, the rod (10) part which experiences the thermal expansion and thermal contraction, an Al rod with 13.3 mm-length, 2 mm-thickness and 5 mm-width is used in this invention. For the fixture (17) parts, a Pyrex glass with 3 mm-length, 5 mm-width, 3 mm-height for attaching to the cut-element (6a), and 4-mm height for attaching to the alignment base substrate. Because Al material has CTE of 24 ppm which is relatively larger than CTE of substrates, it is possible for Al rod with short length to carry out the wavelength compensation upon the temperature shift. FIG. 6 is a graphical illustration of center wavelength characteristics which shows the temperature insensitivity of the temperature insensitive AWG after the temperature compensation, compared to the temperature shift before the temperature compensation. Before the temperature compensation, the center wavelength shift of a conventional AWG in total 100° C. change, form −30° C. to 70° C., is 1100 pm. But, after temperature compensation by temperature insensitive AWG, the center wavelength shift in the same temperature region is maximum 50 pm, so that it has the very good temperature insensitivity characteristics. Because the refractive index of the conventional silicate glass waveguide is around 1.45, it is necessary for the gap-fill material of the gap (16) between the diced surfaces (12a, 12b) to have the refractive index of around 1.4-1.5 range in order to reduce the insertion loss from the alignment as well as it is necessary to have a good optical transparency at the 1.5 um wavelength region. In the present invention, the insertion loss is reduced by 0.6 dB because the gap-fill material with 80% optical transparency at 1.5 um wavelength and the refractive index of 1.41 is used.

In this present invention, because the gap (16) between the diced surfaces (12a, 12b) is 5 um and the gap between the cut-element (6a) of the stripe waveguide and the alignment base substrate (7) is less than 1 um, it is easy to use the gap-fill material (9) with 1000 cps-viscosity or less before curing in order to fill out using the capillary force. Although the gap-fill material (9) has the reliable material property to be maintained without running out, the gap-fill material (9) with 10 of Shore OO hardness or less is used in order to maintain the free lateral movement of the cut-element (6a) for the temperature compensation. In addition, the cured gap-fill material (9) has 0.1 kgf/cm² of the adhesion force or larger, so that it can maintain the y-axial alignment.

Figure 7:
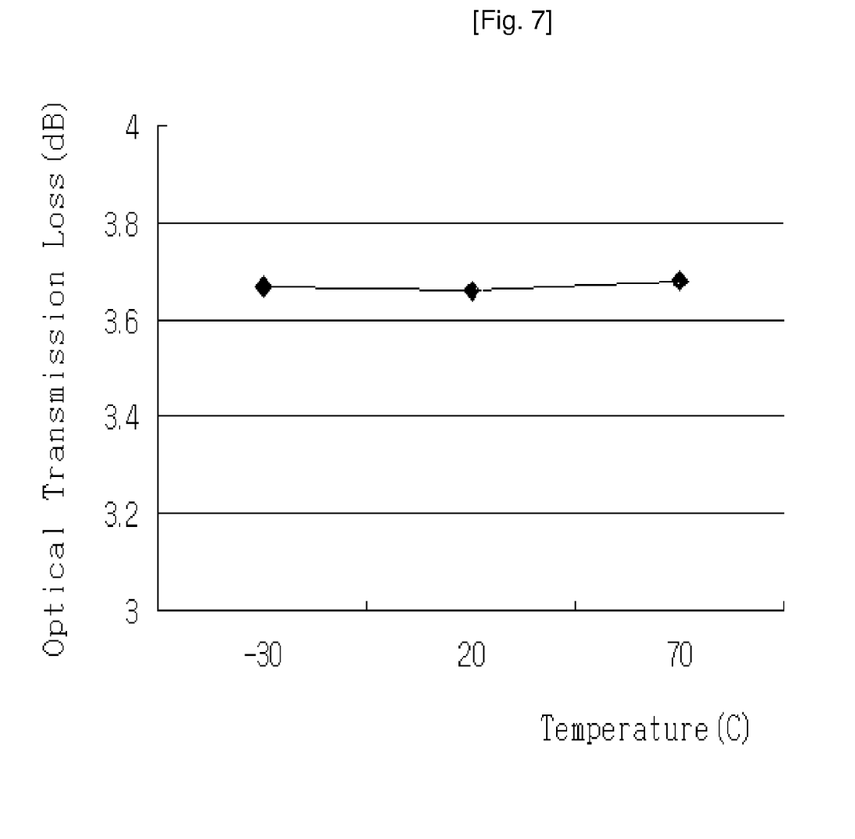
FIG. 7 is a graphical illustration of optical insertion loss stability of the temperature insensitive AWG presented by the present invention.

FIG. 7 is a graphical illustration of optical insertion loss stability of the temperature insensitive AWG at the ITU wavelength presented by the present invention upon the temperature change. As mentioned in FIG. 6, the center wavelength shift is small as well as the insertion loss change is maintained in 0.1 dB or less at the operation temperature of −30° C.~70° C. while the cut-element (6a) moves in the lateral direction (x) in order to compensate the effects from the temperature change.

Mode for the Invention

There are several major technical considerations to have the temperature insensitive operation in the present invention: 1) the technique to move the position of the input stripe waveguide circuit to the exact distance in order to compensate the wavelength shift upon the temperature variation; 2) The alignment between the stripe waveguide circuit connected to the input slab waveguide and the input slab must be held firmly although the cut-element of the stripe waveguide circuit connected to the input slab waveguide moves vertically upon the temperature variation; 3) it must be operated reliably without causing optical performance degradation at the harsh environments such as humidity-condensed low temperature environment or high temperature-high humidity environment.

In accordance with this present invention, the schematic illustration of the temperature insensitive AWG is shown in FIG. 2. The structure consists of the cut-elements (6a, 6b) of AWG chip, the alignment base substrate (7) to re-align and attach these cut-elements of AWG chip, the thin films (8) to control and to maintain the gap (16) between two cut-elements, the gap-fill material (9) between the gap to reduce the optical loss, the lateral sliding rod (10) to compensate the wavelength shift by moving the cut-element (6a) of the stripe waveguide circuit (1) connected to the input slab waveguide in the horizontal (x) direction in accordance with the thermal expansion and thermal contraction, and the gel material (11) to be filled between the cut-element (6a) and alignment base substrate (7). To illustrate the manufacturing process, the pigtailed conventional AWG chip was cut at the interface between the stripe waveguide circuit (1) connected to the input slab waveguide of AWG and the input slap waveguide (3). The cut-cross section (12) can be formed vertically or formed with 8 degree from the vertical direction. Then, both cut-element (6a, 6b) are re-aligned and assembled on the top surface of alignment base substrate (7). The cut-element (6b) of main AWG body is attached and fixed on the surface of alignment base substrate (7) using an adhesive. In this process, the alignment base substrate (7) muse be made of the same material of AWG chip (6) or both substrates (6, 7) must have the similar CTE values. When the alignment base substrate (7) and AWG chip (6) have the different CTE values, then it causes the residual stress and bending deformation due to the different thermal expansion or contraction upon the temperature variation. Consequently, it causes the bad effect on optical alignment as well as the optical performance of the final device.

Figure 3:
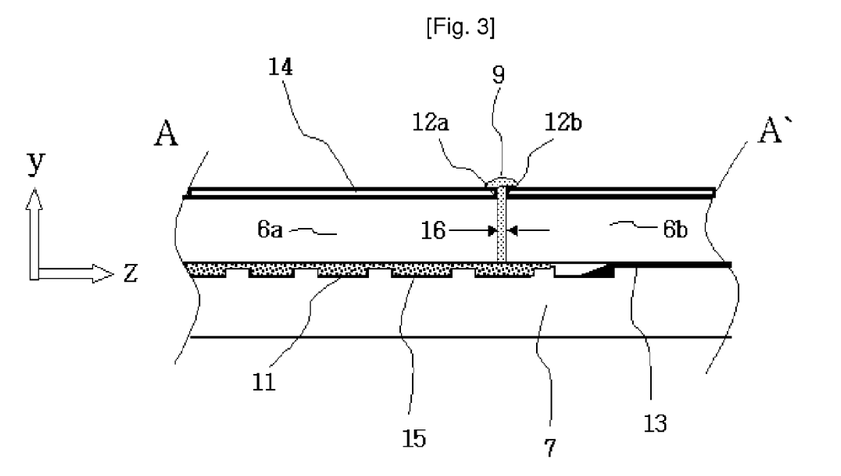
FIG. 3 is a schematic illustration of the cross section view of AA cut of the temperature insensitive AWG in accordance with the present invention, as shown in FIG. 2.

When the stripe waveguide circuit (1) and the input slab waveguide are aligned in general, total 6 optical axes (x, y, z, $\theta_x$, $\theta_y$, $\theta_z$) are aligned precisely. According to this present invention, 5 optical axes (y, z, $\theta_x$, $\theta_y$, $\theta_z$), except for x axis that must have a degree of freedom to control the center wavelength adjustment can be aligned using the passive alignment technique. Because the cut-element (6a) having the stripe waveguide circuit and the other cut-element (6b) of AWG main body are separated from the same AWG chip as well as both cut-elements have the same chip thicknesses, y, $\theta_x$, and $\theta_z$ axes can be passively aligned when both cut-elements are tightly contacted on the surface of the alignment base substrate (7). The optical performance of the device can be changed by the gap (16) between two cut-elements (6a, 6b) at the re-alignment process. When the gap between two cut-elements is large, the optical loss is large and spectral bandwidths are broadened because the light is less focused as it is out of the focal length. As well, it is difficult to perform the optical function properly because the propagation distances to the corresponding arrayed waveguides (5) from the input position are different from each other. Therefore, z-axis, the gap (16) between two cut-elements must be well maintained and adjusted with parallel alignment ($\theta_z$). In accordance with this present invention, the thin films (8) with specific thickness can be inserted into the gap (16) to easily adjust the gap width as well as the diced surfaces (12a, 12b) from two-cut elements can be protected from facet-chipping by undesired collision. FIG. 3 illustrates the cross-sectional view of AA shown in FIG. 2, according to this present invention.

The optical loss at the diced facets (12a, 12b) are generally large because the difference of the refractive indices are large to cause the reflection loss at the facet interfaces as well as the surface roughness from the dicing process are large to generate the optical scattering loss when these facets are directly aligned. So, the index matching fluid has been mainly use to fill out the gap to resolve the such problems in the coupling process, however, it is not a long-term solution because the low-viscose index matching fluid can be running out of the gap area.

In the present invention, the optically transparent high viscose gap-fill material (9) such as sticky thixotropic gel is applied between two interfaces (12a, 12b) to resolve the coupling problems as well as this gap-fill material can be maintained permanently.

For the required material properties of this gap-fill material (9), it must have the excellence optical transparency at the wavelength region. Also, it is preferable to have viscosity (10,000 cps or less) enough to fill the mm-order narrow gap during the initial gap-fill process, and then it is be maintained in the gap after gap-fill and cure. As well, it is preferable to have excellence elastic performance enough to move the cut-element (6a) freely in x-direction with temperature variation. For example, the required minimum linear elastic elongation of gap-fill material after cure is 400% when surrounding temperature is varied by 70° C. difference (it is required to be moved 20 um in x-direction) and the gap width (16) is 5 um.

Figure 4:
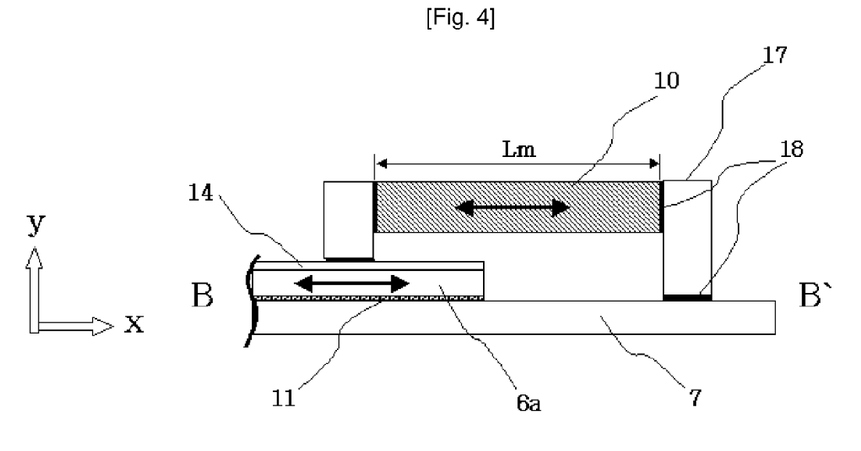
FIG. 4 is a schematic illustration of the cross section view of BB cut of the lateral sliding rod assembly structure as a part of the temperature insensitive AWG, in accordance with the present invention, as shown in FIG. 2.

FIG. 4 illustrates the detail structure of the lateral sliding rod assembly which provide the passive operation of the temperature insensitivity and it is cross-sectional view of BB cut shown in FIG. 2. In order to move the position of the cut-element (6a) containing the stripe waveguide circuit originally connected to the input slab waveguide to the direction of wavelength compensation upon the temperature variation, it is necessary to use the lateral sliding rod having the larger CTE than AWG chip substrate. The CTE values of the various materials are shown at the table below.

TABLE 1

| Material | CTE (ppm/° C.) |
| --- | --- |
| Al | 24 |
| Brass | 19 |
| Cu | 17 |
| Glass (ordinary) | 9 |
| Pyrex | 3 |
| Si | 3 |
| Quartz | 0.5 |
| Fe | 12 |
| Lead | 29 |

The length ($L_m$) of the lateral sliding rod (10) to compensate the center wavelength shift upon the temperature variation can be defined from Formula 7.

$$L_m=(dx/dT)*[1/(CTE_m-CTE_s)]$$ (Formula 7)

wherein (dx/dT) is the movement rate of the position to compensate the center wavelength shift upon the temperature variation, $CTE_m$ is linear CTE of the lateral sliding rod (10) and $CTE_s$ is the linear CTE of the alignment base substrate (7). For example, the length ($L_m$) of the lateral sliding rod (10) to compensate the center wavelength shift upon the temperature variation is 13.3 mm when (dx/dT) is 0.28 um from Formula 6, the silicon is selected for the alignment base substrate (7) and aluminum is selected for the lateral sliding rod (10).

Figure 5:
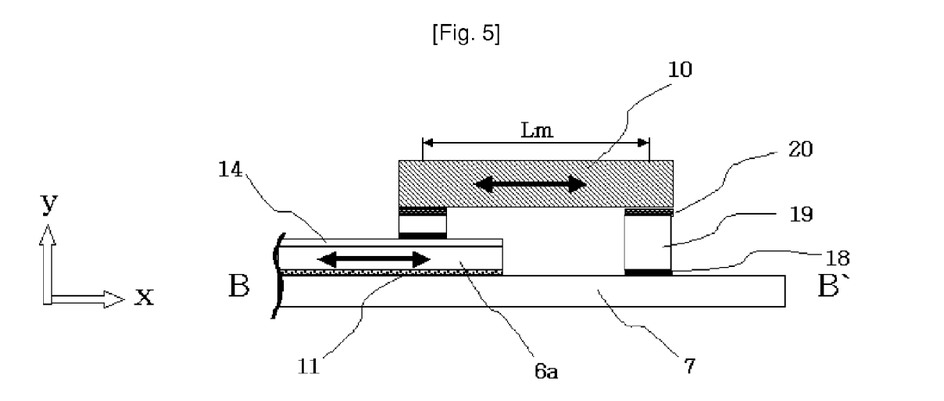
FIG. 5 is a schematic illustration of the cross section view of BB cut of another sliding rod assembly structure as a part of the temperature insensitive AWG, in accordance with the present invention, as shown in FIG. 2.

The lateral sliding rod assembly consists of the rod (10) part and the fixture (17) parts. In order to quick assembly of the substrates (6a, 6b, 7) and the lateral sliding rod, the UV curing adhesives are preferred. In the present invention, Pyrex glass, which has the similar CTE with the substrate as well as the relatively high UV transparency, is used as a fixture part (17). In addition, the end facets of the lateral expansion-contraction sliding rod (10) are attached to the side walls of both Pyres fixture parts (17), so that the active length of the rod can be exactly adjusted and the operation of the this expansion-contraction rod (10) is not to be hindered as shown in FIG. 4. As another preferable structure of the assembly, the bottom surfaces of the both ends of the expansion-contraction sliding rod are attached with the top surfaces of the Pyrex fixture parts as shown in FIG. 5. However, this structure may give the bending problem and delamination at the adhesion interface (20) because of the larger CTE difference between the expansion-contraction rod (10) and Pyrex fixtures (19). As well, the proper operation of the expansion-contraction rod (10) may be hindered, so that it is difficult to control the position of the cut-element by maintaining the exact operation length of the rod. To overcome such problems, the interfaces (20) between the lateral expansion-contraction rod (10) and the fixtures (19) must be bonded by using an adhesive, which has the low elastic modulus (<5 Gpa) and large elastic elongation (>100%). For example, the RTV 3140 form Dow Corning is found to be a preferable adhesive to attach two materials having the large CTE difference without causing the bending as well as hindrance of the proper operation of the expansion-contraction rod because it has the soft property as 32A of Shore hardness as well as the 450% of the elastic elongation.

Although the manufacturing processes introduced in the present invention are well carried out, the stripe waveguide circuit (1) in the cut-element (6a) and the input slab waveguide (3) can be easily misaligned when the temperature of AWG operation environment is varied because there is the residual stress from the CTE mismatching among the materials as well as irregular expansion and contraction. Especially, the cut-element (6a) containing the stripe waveguide circuit can be easily lifted up form the alignment base substrate by causing the y-axis misalignment at the high or low temperature environment, so that the insertion loss of AWG is large. In order to prevent this misalignment problem, the conventional methods is to use the mechanical clip (Furukawa, U.S. Pat. No. 6,668,117 B2) or to use the mechanical parallel housing guide (Siemens, U.S. Pat. No. 6,470,119 B1). However, it is very difficult to maintain the 1mm order accuracy by using the mechanical structures, and the lateral sliding movement is impossible when the large friction is applied. In addition, the proper movement cannot be guaranteed at the moisture-condensed environment or moisture-frozen environment and it is caused by the frozen-moisture at the narrow gap (11, 16) between the mechanical structures.

In this present invention, the mentioned sticky gap-fill material (9) is applied into the gap (11) between the cut-element (6a) and the alignment base substrate (7). It is possible to prevent the free movement where the surface area between cut-element (6a) and alignment base substrate (7) to be applied the gap-fill material is large enough. In order to maintain the free movement of the cut-element (6a), the tight contact-area between the cut-element (6a) and the alignment base substrate is reduced by formation of the grooves on the surface of the alignment base substrate (7). Because the mentioned gap-fill material (9) has the sticky property, the cut-element (6a) is tightly adhered to prevent the lift-off, as well as the free movement is maintained because of the mentioned gap-fill material has the large elastic elongation. In addition, because the mentioned gap-fill material (9) is well filled the gap between the substrates, it can practically prevent the moisture to get into the gap, so that the operation can be stable even under the moisture-condensed low temperature environment.

INDUSTRIAL APPLICABILITY

The temperature insensitive AWG multiplexer is an essential device for the wavelength division multiplexing optical transmission. The present invention can easily provide the temperature insensitive function to any commercial AWG, and the resultant temperature insensitive AWG manufactured by the present invention can widely be operated at not only in-door environment but also harsh environmental out-door condition because it can maintain the optical characteristics without external electric power supply and it can be operated reliably at humidity condensed low temperature environment. Therefore, the present invention can propose the technology for simple manufacturing and reliable device operation, and then this invention can contribute the wide adoption of temperature insensitive AWG in the field.

Numerous other embodiments can be envisaged without departing from the spirit and scope of the invention, which is defined in the claims.

The invention claimed is:

1. A method of forming an arrayed waveguide grating (AWG) device which compensates center wavelength shifts caused by temperature variations, comprising:
    forming two cut-elements which are originated from a main body of an AWG chip by cutting an interface between (i) a stripe waveguide circuit connected to an input slab waveguide and (ii) the input slab waveguide, which are formed on the same substrate;
    aligning the two cut-elements on a top surface of an alignment base substrate;
    attaching a lateral sliding rod to connect between the cut-element containing the stripe waveguide circuit connected to the input slab waveguide and the alignment base substrate;
    assembling a cut-element of the two cut-elements containing the stripe waveguide circuit to be tightly contacted on the top surface of the alignment base substrate; and
    moving the position of the cut-element containing the stripe waveguide circuit along a cut interface of the other cut-element of the two cut-elements containing the input slab waveguide and a waveguide array by thermal expansion and contraction of the lateral sliding rod, in order to compensate the center wavelength shift due to the temperature change,
    wherein an area of the alignment base substrate does not overlap an area of the waveguide array, and the other cut-element of the AWG main body is fixed on a portion of the top busing an adhesive.

2. The method of claim 1, wherein the AWG chip material is formed of the same material as the alignment base substrate or is formed of a material which has coefficient of thermal expansion (CTE) similar to the CTE of the alignment base substrate.

3. The method of claim 1, further comprising:
    applying a gap-fill material having a sticky property or oily material at the stacked gap between the cut-element containing the stripe waveguide circuit connected to the input slab waveguide and the alignment base substrate;
    preventing the misalignment in a y-axis (lift-off) due to the sticky property of the gap-fill material;
    maintaining the free movement of the cut-element containing the stripe waveguide circuit due to the large elastic elongation property of the gap-fill material; and
    preventing condensed moisture from entering into the gap due to the gap-fill material, thereby allowing reliable operation at a low temperature humidity condensed environment.

4. The method of claim 3, wherein the gap-fill material
    has optical transparency;
    has viscosity of 10,000 cps or less enough to fill in the mm-order narrow gap during the initial gap-fill process, as well as being maintained in the said gap without flowing after gap-fill and cure;
    has 10 (or less) of Shore A hardness and 30 (or less) of Shore 00 hardness after the cure; and
    has 400% (or larger) of elastic elongation at −30° C. after the cure.

5. The method of claim 1, further comprising forming grooves on the top surface of the alignment base substrate to reduce the tight contact-area between the cut-element and the alignment base substrate when the free movement of the cut-element is hindered by the large surface friction of the gap-fill material.

6. The method of claim 5, wherein the grooves are formed on the top surface of the alignment base substrate; or the grooves are formed on the bottom surface of the said cut-element containing the stripe waveguide circuit.

7. The method of claim 1, comprising:
    forming a thin film at the gap between the two cut-elements in order to maintain a gap thickness adjustment as well as to prevent facet-chipping by undesired collision during the re-alignment process; and
    forming the film with a thickness of 2 µm~50 µm.

8. The method of claim 7, comprising:
    using an optical transparent gap-fill material to fill out the gap, which is formed and maintained by the films inserted at the gap, in order to reduce optical coupling loss;
    using a gap-fill material to fill out the gap, which is maintained in the gap without running out from the gap; and
    using a gap-fill material which allows cut-element with the stripe waveguide circuit to have a free movement.

9. The method of claim 1, wherein the lateral sliding rod includes a rod part, which experiences the thermal expanding and thermal contraction upon the environmental temperature variation; and
    a fixture part, which connects the rod part to the cut-element substrate and the alignment base substrate.

10. The method of claim 9, wherein the lateral slide rod is formed of a material with a larger CTE than the alignment base substrate for the rod, which needs thermal expansion and thermal contraction; and is formed of borosilicate glass or quartz glass, which has excellent UV transparency, for the fixtures in order to have quick assembly during alignment.

11. The method of claim 10, further comprising:
    attaching end facets of the lateral expansion-contraction sliding rod to the side walls of both glass fixture parts in order to exactly adjust the active length of the rod as well as to exactly transfer the push-pull force of the thermal expansion and contraction.

12. The method of claim 1, further comprising:
    forming a specific groove at the alignment base substrate directly underneath the alignment facets of the two cut-elements in order to prevent small chipping particles being held between the two cut-elements by dropping the chipping particles into the groove.

13. The method of claim 1, further comprising:
    forming the specific adhesive-stop goove(s) to prevent the adhesive running out of the adhesion area when the cut-element of the AWG main body is attached to the alignment base substrate; and
    forming the specific adhesive-stop goove(s) at the inside of the adhesion area.

14. The method of claim 1, further comprising:
    attaching the input and output optical fibers or fiber arrays into an AWG chip before the AWG chip is cut into the two elements.

15. The method of claim 1, comprising:
    forming an alignment base substrate with a size not to be attached at the underneath of the arrayed waveguides section in order to prevent the degradation of the optical characteristics of the arrayed waveguide grating chip when the cut-element of the AWG main body is attached to the alignment base substrate; and forming an alignment base substrate with a structure not to be attached at the underneath of the arrayed waveguides section in order to prevent the degradation of the optical characteristics of the arrayed waveguide grating chip when the cut-element of the AWG main body is attached to the alignment base substrate.

* * * * *

UNITED STATES PATENT AND TRADEMARK OFFICE
CERTIFICATE OF CORRECTION

| | | |
|---|---|---|
| PATENT NO. | : 7,912,330 B2 | Page 1 of 1 |
| APPLICATION NO. | : 11/794767 | |
| DATED | : March 22, 2011 | |
| INVENTOR(S) | : Rhee et al. | |

It is certified that error appears in the above-identified patent and that said Letters Patent is hereby corrected as shown below:

Column 9, line 42, Claim 1, "top busing on adhesive" should read
-- top surface of the alignment base substrate by using an adhesive --

Signed and Sealed this
Twenty-fourth Day of May, 2011

David J. Kappos
*Director of the United States Patent and Trademark Office*